Feb. 16, 1937.  A. R. WURTELE  2,070,769
INTERNAL COMBUSTION ENGINE
Filed Oct. 28, 1931  4 Sheets-Sheet 1
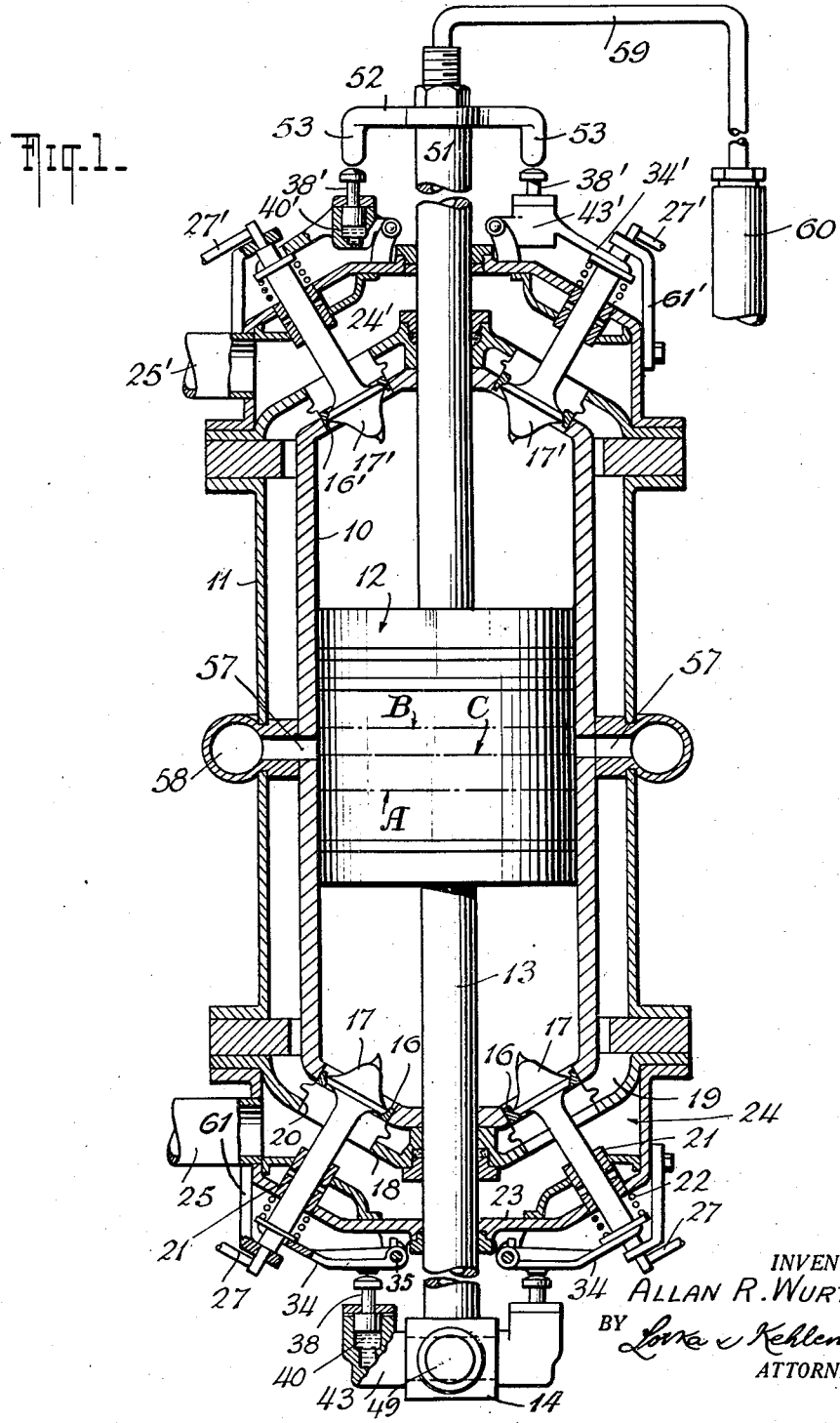
INVENTOR.
ALLAN R. WURTELE
BY Lowe & Kehlenbeck
ATTORNEYS.

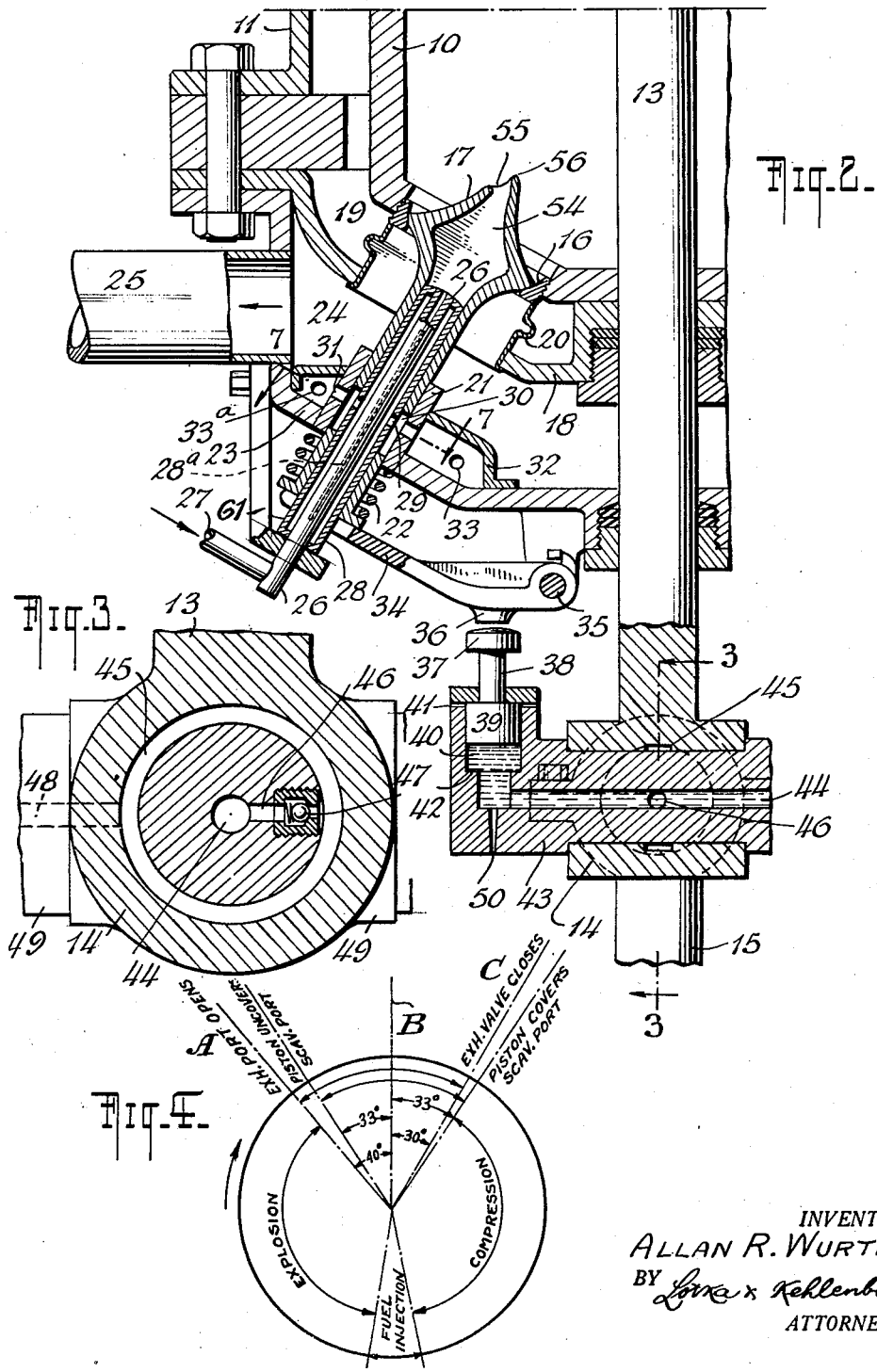

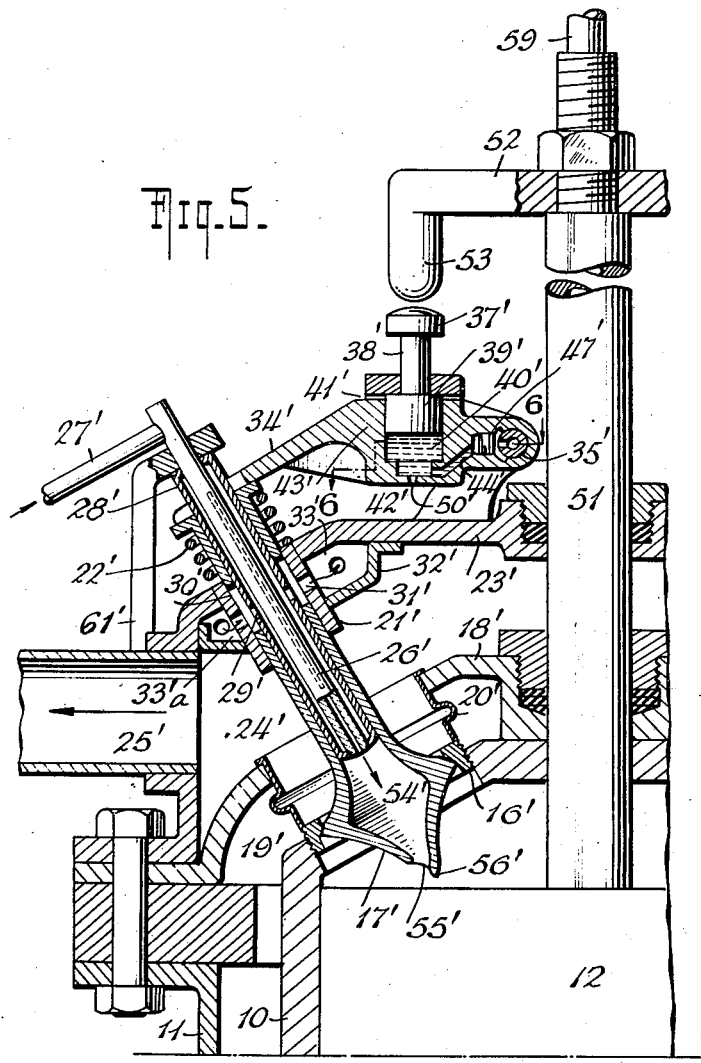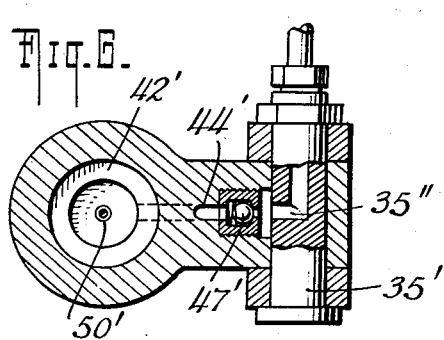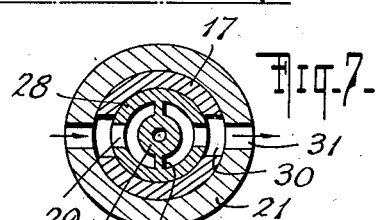

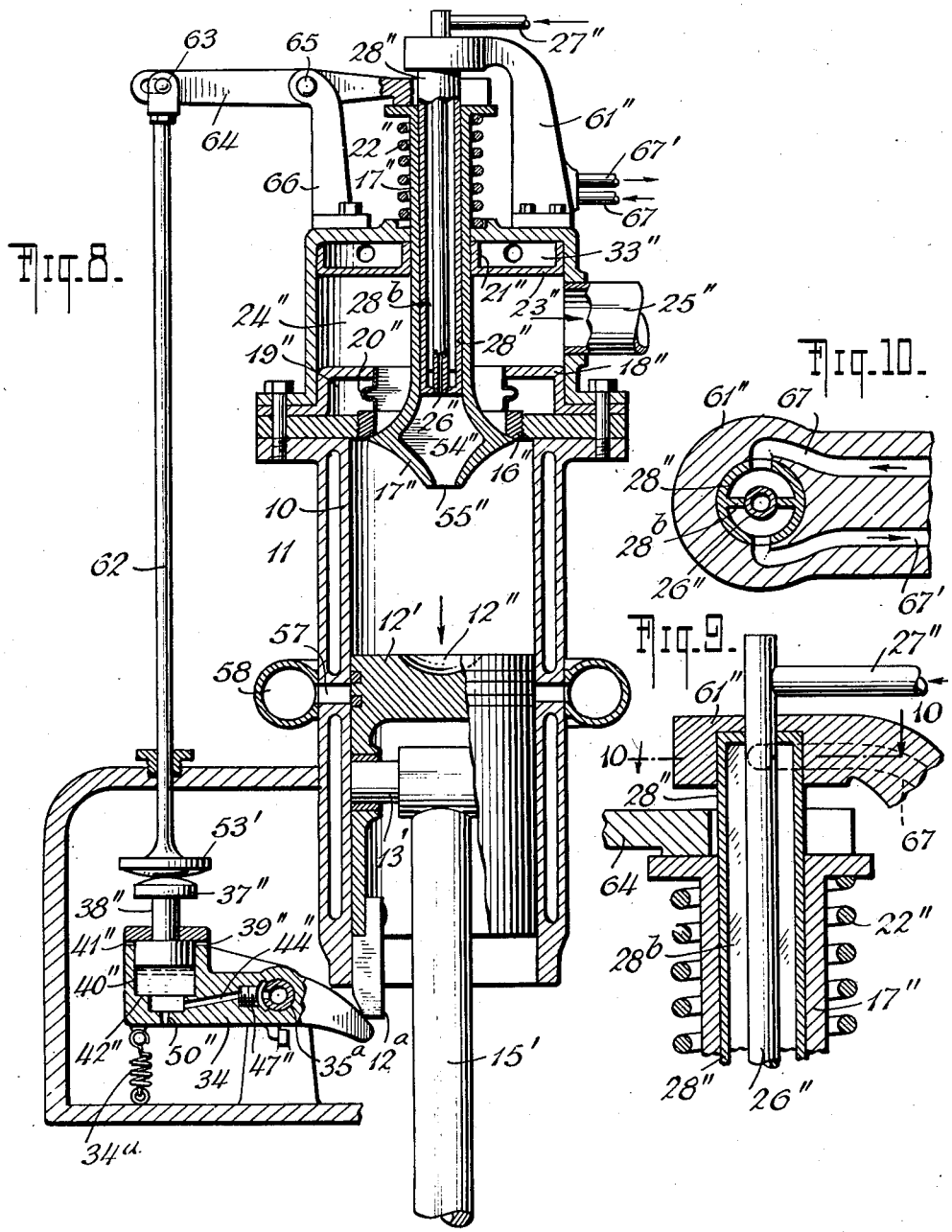

Patented Feb. 16, 1937

2,070,769

UNITED STATES PATENT OFFICE 2,070,769

INTERNAL COMBUSTION ENGINE

Allan R. Wurtele, Minneapolis, Minn.

Application October 28, 1931, Serial No. 571,490
In Germany August 13, 1931

11 Claims. (Cl. 123—32)

My invention relates to internal combustion engines and is primarily designed for application to engines of the Diesel type. One of the objects of my invention is to provide an improved mechanism for the efficient operation of the exhaust valves; another feature of the invention relates to an improved construction of the exhaust valve and its co-operation with the fuel injection nozzle; still another feature relates to a novel arrangement for obtaining a preliminary combustion of the fuel before it is injected into the working chamber of the cylinder; and still other features of the invention relate to novel cooling arrangements, a valve construction which protects the piston rod against excessive heat, and other features which will be pointed out in the detail description following hereinafter.

In the accompanying drawings I have shown two satisfactory and preferred embodiments of my invention as applied to Diesel engines. I desire it to be understood, however, that the invention is applicable to other engines as well. The embodiments illustrated include a novel mechanism which causes the exhaust valve or valves to open before the air for scavenging and for combustion is admitted to the cylinder, and to close before the supply of air to the cylinder is cut off. Thus, an efficient scavenging action will be obtained since a portion of the exhaust gases will pass out of the working chamber before the scavenging air is admitted; furthermore, since air continues to be blown into the working chamber after the exhaust valve is closed, a proper supply of air for the combustion of the fuel will be insured.

In the accompanying drawings Fig. 1 is a vertical section through one of the cylinders of a double-acting Diesel engine embodying my improvements; Fig. 2 shows a portion of the lower cylinder end upon a large scale; Fig. 3 is a cross section on line 3—3 of Fig. 2; Fig. 4 is a diagram illustrating the operation of the engine; Fig. 5 is a partial vertical section of the upper portion of the engine; Fig. 6 is a cross section on line 6—6 of Fig. 5; Fig. 7 is a cross section on line 7—7 of Fig. 2; Fig. 8 is a vertical section through a single-acting Diesel engine embodying my improvements; Fig. 9 is a vertical section of a detail, on an enlarged scale; and Fig. 10 is a horizontal section on line 10—10 of Fig. 9.

While the engine has been shown as having a vertical cylinder, it will be obvious that such engine will work in any position, and the terms "up" and "down" and similar ones used in the description following hereinafter are not to be taken in a restrictive sense.

In the construction illustrated by Figs. 1 to 7, the engine cylinder 10 is shown as provided with a jacket 11 to form a space for the circulation of water or other cooling medium. In this cylinder is arranged to reciprocate the piston 12 provided with a piston rod 13 extending downwardly to connect with a cross-head 14 sliding along suitable guides (not shown) of any customary or approved construction. At 15 I have indicated the connecting rod by which power is transmitted from the cross-head 14 to the crank shaft (not shown) of the engine.

At the lower end of the cylinder 10 I have shown two inclined valve seats 16 adapted to be engaged by the lower exhaust valves 17 which in the particular embodiment illustrated are adapted to reciprocate in directions inclined with reference to the path of the piston rod 13. I prefer this inclined arrangement of the valves and of their seats on account of great compactness, but I desire it to be understood that the inclined arrangement and movement of the exhaust valves is not essential to my invention. Adjacent to the lower end or head of the cylinder 10 is located a jacket 18 to form a chamber 19 in communication with the cooling space of the jacket 11. The valves 17 move within tubular members 20 extending from the valve seats 16 to the jackets 18, said tubular members being of a construction which allows them to expand and contract within certain limits; for instance, as shown, said members or walls 20 may be made with beaded portions which permit ready expansion and contraction as the temperature varies. The stem of each exhaust valve 17 is guided in a stationary tubular guide 21, and the valves are normally held in the closed position by means of coiled springs 22 which bear at one end against a collar on the valve stem, and at the other end against the outer surface of a wall 23 which constitutes the lower wall of the exhaust chamber 24 communicating with the interior of the tubular members 20. While I have shown two exhaust valves at the bottom of the cylinder, it will be understood that this is only an example and that I might employ a single lower exhaust valve or more than two of them. From the exhaust chamber 24 an exhaust pipe 25 leads to the atmosphere, a muffler, or other place of disposal.

The exhaust valve 17 is hollow and within its tubular stem is located the stationary fuel supply nozzle 26 to which fuel is conveyed from any suitable source through a pipe 27. The fuel supply nozzle 26 is surrounded by a stationary jacket 28 in engagement with the inner wall of the tubular valve stem. The jacket is provided at opposite sides with ports 29, one serving as an inlet and the other as an outlet. Between these two ports the jacket is provided with an internal longitudinal partition 28ª which terminates short of the upper and lower ends of the jacket space. Thus, any fluid entering through one of the ports 29, as indicated by the arrow in Fig. 7, will be compelled to flow lengthwise, both up and down, in the adjoining compartment formed by the partition 28ª, and then the fluid will pass above and below the ends of such partition to the other compartment and lengthwise of said compartment to the other port 29. The stem of the valve 17 is provided with longitudinal ports or slits 30 of such length as to remain in communication with the ports 29 notwithstanding the movement of the valve. These slits 30 are also in permanent communication with ports 31 in the valve guide 21. The latter is associated with interior walls 32 which in conjunction with the lower wall 23 of the exhaust chamber 24 form two separate chambers 33 and 33ª respectively which communicate with the slits or ports 31. One of these chambers, as 33ª, may be connected with a supply of water or other cooling fluid, while the other, 35, would be provided with a suitable outlet as indicated.

The lower ends of the valve stems are adapted to be engaged and operated by rocker arms 34 fulcrumed at 35 on a stationary part of the engine. Each rocker arm has a projection 36 adapted to be engaged at times, as described hereinafter, by a head 37 on a plunger rod 38 which extends upwardly from a plunger body 39. This plunger body is arranged to move up or down in a cylinder 40 provided with vents 41 at its upper end, and at its lower end with a shoulder 42 which limits the downward motion of the plunger body. The upward motion of the plunger body is limited by the top of the cylinder 40. The cylinders 40 are formed in a cylinder block 43 rigidly secured to the cross-head 14 and provided with a duct 44 connecting the cylinders. Fluid under pressure is supplied to the duct 44 and to the cylinders 40. For instance, an annular oil supply duct 45 in the cross-head 14 may be connected with the duct 44 by means of a radial duct 46 in the cylinder block 43, a non-return valve 47 being arranged in this duct, to close toward the annular supply duct 45 whenever the pressure in the duct 44 is greater than that in the duct 45.

The supply of oil or other suitable liquid to the annular duct 45 may be obtained in any suitable manner, for instance by means of a duct 48 in one of the side portions 49 of the cross-head 14, said duct communicating with a suitable duct (not shown) in the connecting rod 15, oil under pressure being supplied to the connecting rod duct by a pressure supply system of any usual or approved type. The duct 44 is also provided, preferably in line with the path of each plunger body 39, with an outlet 50 of comparatively small cross section. Oil which is discharged through this outlet during the operation described hereinafter, will be caught in the crank case of the engine or in any other suitable manner.

The embodiment illustrated by Figs. 1 to 7 is a double acting engine, that is to say it has exhaust valves and fuel inlets at both ends of the cylinder 10. The arrangement of the valves and fuel inlets at the upper end of the cylinder is substantially the same as described with reference to the lower end, the parts 16' to 33' being substantially the same as the parts 16 to 33, so that detailed description thereof will be unnecessary. The upper rocker arms 34' are fulcrumed at 35' on stationary pipes provided with axial ducts connected with a supply of oil or other fluid under pressure. These axial ducts connect by radial ducts 35'' with ducts 44' in the respective rocker arms 34', these rocker arms being formed with cylinders 40' communicating with the ducts 44' and having vents 41' at their upper ends as well as shoulders 42' at their lower ends and outlets 50'. Each duct 44' is controlled by a check valve 47' which closes toward the duct 35'' through which the liquid under pressure is supplied. In the cylinders 40' are slidable the plunger bodies 39' connected by the rods 38' with the heads 37'. The parts 37' to 42' and 44', 50' are similar to the correspondingly designated parts at the lower end of the cylinder. From the piston 12 projects upwardly a rod 51 carrying a cross piece 52 provided with projections 53 adapted to engage the plunger heads 37'. It will be seen that at the bottom of the engine, the cylinders 40 and plungers 39 are carried by a member 43 reciprocating with the piston 12 and adapted to engage valve actuating members 34. At the upper end of the engine, the reverse arrangement has been shown, that is to say, the cylinders 40' and the plunger bodies 39' are carried by the valve actuating members 34', while the projections 53 which engage the plunger heads 37' reciprocate in unison with the piston 12. One arrangement, of course, is the equivalent of the other, and it is immaterial whether the plunger body (39, 39') is carried by the reciprocating member or is engaged by the reciprocating member.

Figs. 2 and 5 show the particular construction of the exhaust valve which I prefer to employ. According to this, the tubular exhaust valve is provided with an enlargement or chamber 54, 54', between the inner end of the valve and the fuel supply nozzle 26, 26'. The outlet 55, 55' is of considerably smaller cross section than said chamber, which on account of its function I term a "precombustion chamber". Preferably a lip 56, 56' is provided adjacent to the outlet 55, 55', on the side toward the piston rod 13 or 51 respectively so that the fuel coming out at 55 or 55' will be deflected away from the piston rod, the purpose being to protect the piston rod against excessive heat. The inner end of the valve 17 or 17' projects into the respective chamber of the cylinder 10.

Air under pressure is supplied to the interior of the cylinder 10 through ports 57 located approximately midway between the two cylinder ends. These ports receive their supply of compressed air from an annular channel 58 connected with an air compressor or other source of compressed air.

In Figs. 1 and 5 I have indicated the rod 51 as tubular and connected with a pipe 59 which reciprocates therewith, the outer end of such pipe being bent to extend parallel with the path of the piston 12 and to telescope into a stationary pipe or cylinder 60 connected with a source of a cooling agent. This cooling agent would pass through the pipe 59 and through the hollow tail rod 51 into suitable passages or chambers within the piston 12, to cool the latter. This piston construction has not been illustrated in detail, as it is well-known in the art; in prior constructions, however, the supply of cooling fluid to the interior of the piston has been exclusively through the piston rod proper (13), and not through a tail rod, such as 51, at the other side of the piston. In my new arrangement, the cooling fluid may, for instance, enter the piston through the tail rod 51 and pass out of it through the hollow piston rod 13, to connections such as have been used previously in conjunction with hollow piston rods. Fig. 1 indicates that the piston rod 13 may be hollow.

The operation is as follows: The exhaust valves 17, 17' are normally closed by their springs 22, 22'. As long as the plunger heads 37, 37' do not engage the corresponding projections 36, 53, said heads are fully projected from the cylinder block 43 or the rocker arms 34' respectively, that is to say, the plunger bodies 39, 39' are at the upper ends of the cylinders 40, 40' respectively. The valves 47, 47' are open, and the said plunger heads are held in their projected position by the pressure of the oil in the ducts 44, 44' respectively. As the piston 12 rises, it will reach a position, indicated at A in Fig. 4, where the plunger heads 37 will engage the projections 36, the lower face of the piston 12 being at the level indicated at A in Fig. 1. At this point, therefore, the exhaust valves 17 will begin to open. It will be seen that the opening of the valves 17 at first is not a positive movement, that is to say, the rocker arms 34 and the valves 17 do not move in absolute unison with the cross-head 14 and the cylinder block 43, but a certain amount of lost motion is provided, the plunger bodies 39 yielding and moving gradually toward the shoulders 42, by a sort of dashpot action. I thus avoid the hammering which would occur if such loose connection or dashpot construction were omitted. As soon as the plunger heads 37 engage the projections 36, a considerable resistance is opposed to their upward motion, and the result is that the fluid contained in the cylinders 40 and in the duct 44, is subjected to a considerable pressure, which causes the valve 47 to shift to the position in which it disconnects the duct 44 from the supply of oil, it being understood that the pressure created in the cylinders 40 is greater than the pressure under which the oil is supplied to the ducts 48, 49. As soon as the exhaust valves 17 open, the hot gases pass out through the tubular members 20 and the exhaust chamber 24 to the exhaust pipe 25. It will be noted that this occurs before the lower face of the piston 12 has uncovered the scavenging or air admission ports 57. For instance, as illustrated in Fig. 4, the exhaust valves 17 may open at a point 40° from the uppermost position of the piston 12, while the lower face of the piston 12 will uncover the ports 57 at a point 33° from the uppermost position of the piston 12. As soon as the scavenging ports are opened, air will rush through the lower chamber of the cylinder 10 and out through the lower exhaust ports, since the exhaust valves 17 are still open. The letter B in Fig. 4 indicates the upper end of the piston stroke, and in Fig. 1 the letter B indicates the corresponding position of the lower face of the piston 12 at the end of the upward stroke. During the downward stroke of the piston 12, the exhaust valves 17 will close at a point considerably nearer to the top position B than the point at which the exhaust valves opened. This is due to the fact that during the downward stroke of piston 12, the plunger bodies 39 are in their lowermost position relatively to the cylinder block 43, in other words, said plunger bodies are in engagement with the shoulders 42. Thus, the exhaust valves 17 may be arranged to close, for instance, 30° from the position B of Fig. 4, as indicated at C. The corresponding position of the lower face of the piston 12 is indicated at C in Fig. 1. It will be noted that at this time the scavenging ports 57 are still open to the lower chamber of cylinder 10. Therefore, after the closing of the exhaust valves 17, a further amount of air is injected into said lower chamber of cylinder 10. This additional air is supplied for supporting combustion during the next explosion or combustion stroke. As the piston 12 continues on its downward stroke, it will close the scavenging ports or air ports 57, for instance at a point 33° from the position B, as indicated in Fig. 4. Of course, the point at which the scavenging or air ports 57 begin to be opened during the upward stroke of piston 12, and the point at which said ports are closed during the downward piston stroke, are at equal distances from the top position B (33° in the particular example assumed). As the downward movement of the piston 12 continues, the air contained in the lower chamber of cylinder 10 is compressed in the well known manner, and toward the end of the compression period fuel is admitted through the nozzles 26, the timing of the fuel admission being effected by mechanism of any well known or approved construction, and as various mechanisms of this kind are available in the prior art, I have not deemed it necessary to illustrate the mechanism by which the injection of the fuel is timed. The diagram shows that the admission of fuel through the nozzles 26 continues for a short period after the piston has begun its upward movement, and thereupon occurs the explosion or combustion stroke (power stroke) which continues until the exhaust valves open at the position A, whereupon the cycle is repeated.

In the upper chamber of cylinder 10, exactly corresponding operations take place so that detailed description thereof is believed to be unnecessary. Of course, as to timing, the operations in the upper chamber are just the reverse of those in the lower chamber, that is to say, if applied to the operations in the upper chamber of cylinder 10, the diagram Fig. 4 would have to be read as representing at B the lowermost point of the piston stroke instead of the uppermost point. In other respects, however, this diagram will represent the conditions exactly as described in connection with the operation of the lower chamber of the engine. It will be noted that the air ports 57 are arranged to supply air at one time to the lower chamber of the cylinder 10 and at another time to the upper chamber of said cylinder. These air ports are located about midway of the piston stroke, but not exactly so, on account of the difference in the angular motion of the connecting rod and crank near the lower dead center as compared with their motion near the upper dead center.

The oil which escapes from the outlets 50' of the cylinders 40' may be collected in a suitable drip pan (not shown) or disposed of in any other manner.

As soon as the exhaust valves 17 or 17' close during the downward or upward stroke of the piston 12 respectively, the pressure keeping the plunger bodies 39 or 39' respectively against the shoulders 42, 42' respectively ceases, and the pressure of the oil supplied from the pressure system opens the valves 47 or 47' respectively, so that the pressure fluid will again fill the cylinders 40 or 40′ respectively and cause the plunger heads 31 or 31′ respectively to be projected to the position illustrated by the drawings.

It will be noted that the fuel is not injected directly into the compartments or chambers of the engine cylinder 10, but into the precombustion chambers 54, 54′ formed in the exhaust valves 17, 17′ respectively. A somewhat lower pressure exists in these precombustion chambers than in the engine cylinder proper, and thus the injection of the fuel is facilitated. The various cooling arrangements assists in obtaining an efficient operation of the engine. The arrangement illustrated enables me to make the exhaust valves comparatively large, which likewise is an advantage conducive to efficiency in operation. The use of large-sized exhaust valves also affords facilities for cooling them, as well as for the placing of the fuel-injection nozzles within the exhaust valves, as described, whereby a very compact arrangement is secured.

The employment of a loose connection of the character described, between the engine piston 12 and the exhaust valves 17, 17′, enables me to obtain the closing of the exhaust valves at a point (such as C) nearer to the end point (B) of the piston stroke than the point (such as A) at which the exhaust valves open, as clearly shown in the diagram Fig. 4, which is an eminently desirable operation. It will be noted that I obtain this result without the use of cam shafts or like expedients commonly employed for the operation of valves, but utilize the motion of the piston 12 (and the parts 14, 53 rigid therewith) as the means for actuating the exhaust valves 17, 17′. In the particular example illustrated, the piston 12 and the parts rigid therewith operate the exhaust valves indirectly, because in this example the path of said valves is not parallel to that of the piston, and thus additional parts, such as the rockers 34, 34′, had to be interposed between the valves and the parts rigid with the piston. Of course, it is not essential to my invention that the valves should move obliquely to the piston path, and as will be evident to any man skilled in the art, the interposition of rockers or equivalent members would not be necessary in cases in which the valve movement would be parallel to the piston path; the dash-pot construction (39, 40 and 39′, 40′) would be used in that case also.

Rounded surfaces are shown on the co-operating ends of the members 31′, 53 to permit proper engagement throughout the range of the rocking movement; the plunger heads 31 are also shown with rounded surfaces, and this arrangement might also be adopted for the projections 36, although in the drawings they are shown as having flat end surfaces.

If desired, coiled springs might be located in the cylinders 40, 40′, between the plunger bodies 39, 39′ and the bottom (shoulders 42, 42′) of said cylinders, to assist the oil pressure in projecting the plunger heads to the position shown, and to enable these parts to be made of smaller dimensions than if oil pressure alone is relied upon for this purpose.

In order to enable the stationary jackets 28, 28′ to resist the great outward pressure to which they are exposed, I may brace them by stationary brackets such as indicated at 61 and 61′ respectively.

In Figs. 8 to 10 inclusive I have shown another embodiment of my invention. Details of many of the parts shown in these three figures are substantially the same as described in connection with the first form of my invention; this applies particularly to the parts 10, 11, 16″ to 28″, 34″, 35a, 37″ to 42″, 44″, 47″, 50″, 54″, 55″, 57 and 58 of Figs. 8 to 10. The engine shown in Fig. 8 is a single-acting one, having an exhaust valve 17″ at the top only. Inasmuch as in this embodiment the piston 12′ has no rod projecting toward the exhaust valve, there is no need of a lip such as 56 or 56′ and the discharge opening 55″ may be exactly at right angles to the axis of the valve. The piston 12′ is a so-called trunk piston, that is to say, it has no piston rod, but has a direct pivotal connection, as at 13′ with the connecting rod 15′. In the upper face of the piston 12′ I have indicated a recess 12″ into which the outlet portion of the exhaust valve 17″ extends when the piston is in its uppermost position. Since there is no cross-head in the construction illustrated by Fig. 8, I have indicated other means for operating the exhaust valve in accordance with the movements of the piston. For this purpose there is secured rigidly to the piston at its lower end, an actuating projection 12a which is adapted to engage the rocker 34″ fulcrumed at 35a in substantially the same manner as the rocker 34′ of Fig. 5. A spring 34a is provided to restore the rocker to the position shown, after the rocker has been swung by the actuating projection 12a. Such swinging movement will cause the plunger head 37″, which is normally in the projected position illustrated, owing to the pressure of the oil in the duct 44″, to press upwardly against the projection 53′ at the lower end of a vertically sliding rod 62, the upper end of which has a pivotal connection at 63 with a rocker arm or lever 64 fulcrumed at 65 on a stationary bracket 66. The right hand end of the lever 64 engages the flange at the outer end of the valve 17″ and when the rod 62 moves upwardly as described, the valve 17″ will be moved downwardly from its seat 16″ so that first the exhaust gases and later the air blown into the cylinder will be able to pass out to the exhaust pipe 25″.

The operation of this second form of my invention, as regards the timing of the exhaust valve and of the scavenging air ports 57, will be substantially the same as described in connection with Figs. 1 to 7 and it is believed unnecessary to repeat this in detail. Figs. 8 to 10 also illustrate slight differences in the manner of cooling the exhaust valve and the adjacent parts. The chamber 19″ may have no direct connection with the space of the cylinder jacket 11, but may be provided with its own inlet and outlet for the cooling fluid. A single cooling chamber may be provided at 33″ instead of two cooling chambers as in the form of construction first described. The chamber 33″ may have its own inlet and outlet for the cooling medium, as indicated. The outer end of the jacket 28″ is held by engagement with a stationary bracket 61″. Within this bracket I have shown channels 67, 67′ through which a cooling medium may enter and leave respectively. The supply channel 67 leads to a port in the jacket 28″, the latter also having transverse vertical partitions 28b which extend to the top of the space between said jacket and the fuel supply nozzle 26″. The lower ends of said partitions, however, are at a distance above the lower end of the jacket 28″, as shown clearly in Fig. 8. The ports communicating with the channels 67, 67′, are located on opposite sides of the partitions 28b, and near the top thereof. Thus, the cooling fluid entering through the channel 67 will be compelled to travel downwardly along the partitions 28b and then pass under the lower edges of these partitions to travel upwardly to the outlet channel 67'.

While in Fig. 8 I have illustrated the rocker 34'' as operated by a projection 12a on the piston 12', it will be obvious that such projection, instead of being mounted on the piston, could be mounted on a cross-head of the same character as the one shown at 14 in Figs. 1 and 2, that is to say, the piston in this case would not be a trunk piston, but would have a piston rod and a cross-head. Of course, in this case the rocker would have to be placed in a lower position than in Fig. 8, and the rod 62 would have to be lengthened correspondingly. This modification and others may be made without departing from the nature of my invention as set forth in the appended claims.

I claim:

1. In an internal combustion engine, a power cylinder having a port, a valve having an enlarged head portion and a hollow stem for controlling said port, a stationary cooling fluid container on which said valve is mounted to slide, and fuel supply means including an atomizing nozzle extending centrally of said container and communicating with the power cylinder.

2. In an internal combustion engine, a power cylinder having a port, a valve having an enlarged head portion and a hollow stem for controlling said port, stationary fuel supply means including an atomizing nozzle located axially in said valve stem, and a stationary cooling jacket surrounding said fuel supply means, said valve stem having a sliding engagement with said jacket.

3. In an internal combustion engine, a power cylinder having a port, a valve having an enlarged head portion and a hollow stem for controlling said port, a fuel-supply conduit extending lengthwise within said valve stem, a cooling jacket on which said valve is mounted to slide interposed between said valve stem and said conduit, and means constituting a cooling chamber surrounding a portion of the valve stem.

4. In an internal combustion engine, a power cylinder having an exhaust port, a tubular valve controlling said port and having a precombustion chamber therein, a stationary fuel supply conduit within said valve, and a nozzle in said conduit for spraying a fuel into said chamber.

5. In an internal combustion engine, a power cylinder having a port, a tubular valve controlling said port and provided at its inner end with a precombustion chamber having a contracted outlet leading to the cylinder, and a stationary fuel supply conduit on which said valve is mounted to slide for delivering fuel into said chamber, said conduit having an atomizing nozzle in the lower end thereof.

6. In an internal combustion engine, a power cylinder having a port, a tubular valve controlling said port and provided at its inner end with a precombustion chamber having a contracted outlet leading to the cylinder, a stationary fuel supply conduit on which said valve is mounted to slide for delivering fuel into said chamber, and a lip at said contracted outlet on the side toward the axis of the cylinder.

7. In a two cycle internal combustion engine, a cylinder having a head provided with an exhaust gas port, the walls of said cylinder having openings therein adjacent the lower end of the cylinder combustion chamber, an annular air box for supplying a combustion supporting and scavenging medium through said openings, a poppet valve for closing said exhaust gas port, and means extending coaxially of the poppet valve for supplying a combustible to the cylinder.

8. In an internal combustion engine a power cylinder, a cylinder head having an exhaust port and a cooling chamber, a valve for said port having an enlarged head portion and a hollow stem, a stationary stem disposed centrally of said valve stem and adapted to guide said valve, said stationary stem having a cooling chamber therein in communication with said first named cooling chamber through openings in the valve stem, and means for introducing fuel centrally of said second named cooling chamber to said power cylinder.

9. In an internal combustion engine provided with a power cylinder having an exhaust port, a valve for controlling said port, said valve having a tubular stem portion and an enlarged head portion with an opening in the lower end thereof, the inner walls of the enlarged head portion defining a precombustion chamber, a stationary fuel injection member having a centrally disposed fuel passage extending into the stem portion and terminating adjacent the upper end of said precombustion chamber, and means for introducing fuel through the fuel passage into the upper end of said precombustion chamber, the opening in the lower end of the head portion of the valve being relatively large with respect to the fuel passage in the stationary member.

10. In an internal combustion engine, a power cylinder, a head for said cylinder having a port therein, a valve having an enlarged head portion and a hollow stem, a stationary spindle depending into said stem and serving as an interior guide for said valve, the lower end of said valve and spindle constituting a precombustion chamber, and means for introducing a fuel through a passage in said spindle into said precombustion chamber.

11. In an internal combustion engine, a cylinder having an exhaust gas port in the upper end thereof, the walls of said cylinder having port means therein adjacent the lower end of the cylinder combustion chamber, means for supplying a combustion supporting and scavenging medium through said port means, valve means for closing said exhaust port, and means extending coaxially of said valve means for supplying a combustible to the cylinder.

ALLAN R. WURTELE.